United States Patent [19]
Fischer

[11] Patent Number: 5,418,610
[45] Date of Patent: May 23, 1995

[54] DISTANCE INDICATING MIRROR

[75] Inventor: Kenneth J. Fischer, Canton, Ohio

[73] Assignee: Fischer Products, Inc., Oil City, Pa.

[21] Appl. No.: 257,060

[22] Filed: Jun. 8, 1994

[51] Int. Cl.$^6$ ............................ G01C 3/00; G02B 5/10
[52] U.S. Cl. ........................................ 356/21; 359/838
[58] Field of Search ................. 356/3, 20, 21; 33/264, 33/277; 359/838, 884, 602, 603, 870, 871

[56] References Cited

U.S. PATENT DOCUMENTS

| | | | |
|---|---|---|---|
| 1,887,144 | 11/1932 | Wilczynski | 359/603 |
| 2,881,655 | 4/1959 | Eisenschink | 356/21 |
| 4,023,029 | 5/1977 | Fischer | 359/838 |
| 4,223,983 | 9/1983 | Bloom | 359/871 |
| 4,330,120 | 5/1982 | Netti | 482/105 |
| 4,693,030 | 9/1987 | Wohead | 43/42.22 |
| 4,860,477 | 8/1989 | Gooch | 40/603 |
| 5,189,537 | 2/1993 | O'Farrell | 359/838 |

FOREIGN PATENT DOCUMENTS

| | | | |
|---|---|---|---|
| 1570625 | 6/1969 | France | 359/838 |
| 2148022 | 3/1973 | Germany | 359/838 |
| 3411082 | 11/1984 | Germany | 359/838 |

Primary Examiner—F. L. Evans
Attorney, Agent, or Firm—Paul E. Milliken; Lee A. Germain

[57] ABSTRACT

A vehicle mirror having an image reflecting surface and a distance indicating light reflective indicia of contrasting reflectivity to the image reflecting surface, the indicia being located in such a position on the mirror that when a just passed vehicle appears on the mirror at a certain location with respect to the indicia, it is safe to pull over into the lane in front of the just passed vehicle. One embodiment of the distance indicating indicia is a reflective horizontal line located below the center of the mirror.

27 Claims, 2 Drawing Sheets

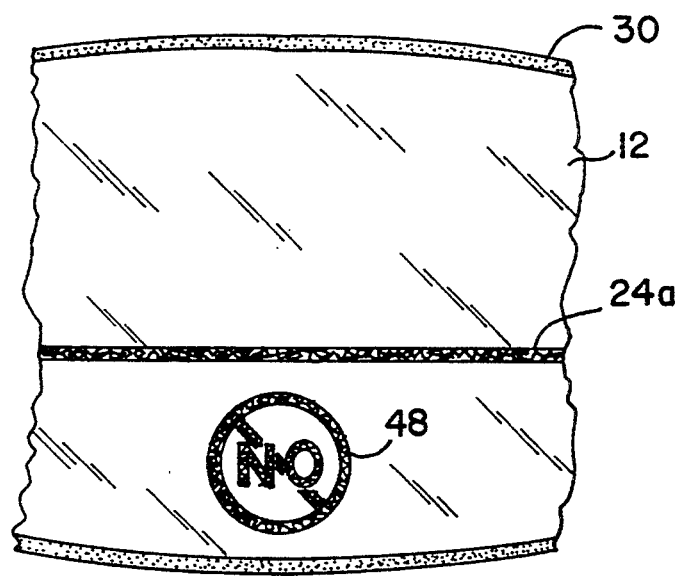
FIG. 6
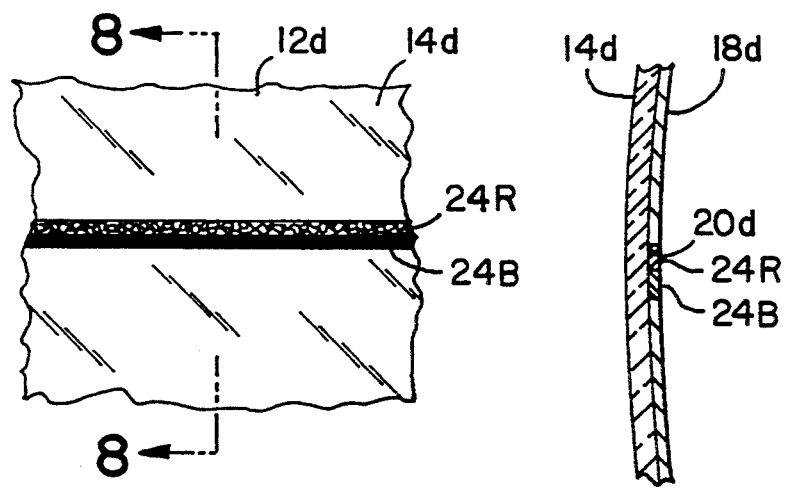
FIG. 7
FIG. 8
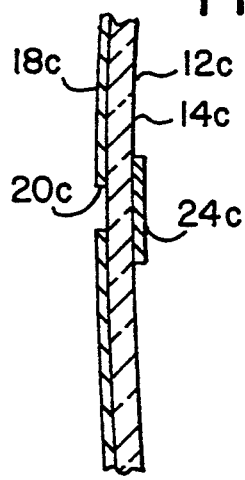
FIG. 9

DISTANCE INDICATING MIRROR

TECHNICAL FIELD

This invention relates to rear viewing indicating devices for automotive vehicles and more particularly to a mirror device for indicating safe distance conditions for a passing vehicle to pull into the lane of a just passed vehicle.

BACKGROUND OF THE INVENTION

This invention is an improvement over my prior U.S. Pat. No. 4,023,029 issued May 10, 1977, and entitled "Distance Indicating Mirror Device". My prior patent discloses a back-lighted horizontal line on a vehicle mirror to serve as a safe distance indicator for changing lanes after passing a vehicle. When the image of a just passed vehicle appears above the lighted line, this is an indication that the passing vehicle which carries such mirror is a safe distance in front of a just passed vehicle to change into the lane in front of the passed vehicle.

While the mirror device in my prior patent works well, this invention simplifies the prior invention by eliminating the need for light bulbs, light sockets and electrical wiring within the mirror housing.

In order for the horizontal distance indicator line to be useful at all times it must be readily visible both in day and night driving conditions.

By providing a light reflective line of contrasting color to the image reflecting surface of the mirror, the line is visible as night due to the light reflected from the headlights of a just passed vehicle and it is visible in the daylight due to the contrasting color of the line.

OBJECTS OF THE INVENTION

A general object of the invention is to provide a distance indicating rear view mirror for vehicles which is simple to manufacture and install on a vehicle.

Another object of the invention is to provide a distance indicating rear view mirror which is useful both day and night without the need for bulbs or other form of back lighting behind the reflective surface of the mirror.

A further object of the invention is to provide a distance indicating rear view mirror from which it is easy to interpret a safe pull-in distance in front of a just passed vehicle.

Still another object of the invention is to provide a distance indicating rear view mirror in which the mirror and distance indicating device thereon form an aesthetically pleasing appearance.

These and other objects of the invention will become more fully apparent in the following description and the attached drawings.

SUMMARY OF THE INVENTION

This invention is a distance indicating mirror device carried by a passing vehicle for indicating a safe passing distance between the passing vehicle and a passed vehicle comprising: a convex mirror having an image reflecting surface for reflecting an image of a passed vehicle; reflective indicia of contrasting visibility to the image reflecting surface for providing a location of reference on the mirror for judging the distance between the passing vehicle and the passed vehicle; said indicia being visible under both daylight and nighttime conditions when exposed to the headlights of the just passed vehicle.

DESCRIPTION OF THE DRAWINGS

FIG. 6 is a fragmentary front elevational view of a mirror similar to the one shown in FIG. 1 showing an additional indicia positioned on the lower portion of the mirror;

FIG. 7 is a fragmentary front elevation view of another embodiment of the invention shown in FIG. 1;

FIG. 8 is a fragmentary cross-sectional view taken on line 8—8 of FIG. 7; and

FIG. 9 is a fragmentary front elevational view of another embodiment of the invention.

DESCRIPTION OF THE PREFERRED EMBODIMENTS

Figure 1:
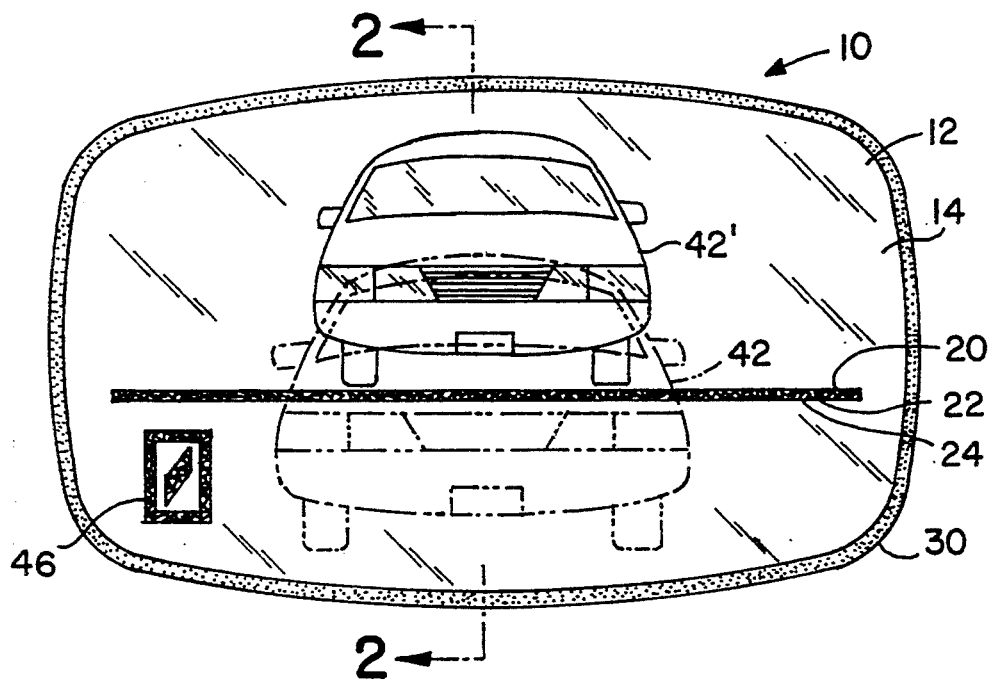
FIG. 1 is a front elevational view of the distance indicating mirror of the invention.
Figures 2, 3, 4, 5:
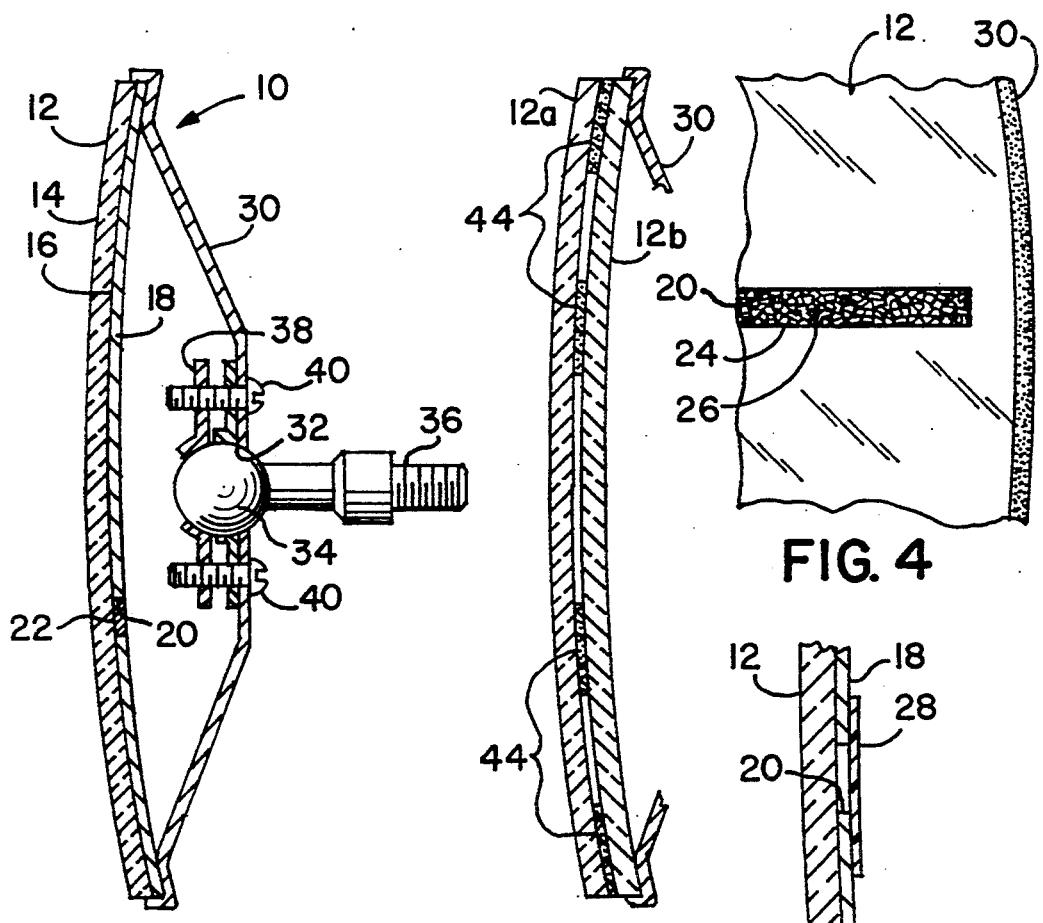
FIG. 2 is a cross-sectional view taken on line 2—2 of FIG. 1.
FIG. 3 is a fragmentary cross-section view of an embodiment of the invention showing distance indicating mirror of the invention adhesively secured to the front face of a conventional rear view mirror.
FIG. 4 is an enlarged fragmentary view of a portion of the mirror shown in FIG. 1.
FIG. 5 is a fragmentary cross-sectional view showing another embodiment of the invention in the area of the distance indicating indicia.

Referring now to the drawings and in particular to FIGS. 1 and 2, a mirror device or assembly is indicated generally by the numeral 10. The assembly includes a mirror 12 having a transparent glass panel 14 and an image reflective surface 16 formed in a conventional manner on the back side of the mirror glass by a layer 18 of silver, chrome or other reflective material.

The image reflective layer 18 has an elongated narrow horizontal gap 20 in the image reflective material in which is located a layer 22 of light reflective material of a contrasting color to image reflective layer 18 and which forms a horizontal line 24 which is visible in the daylight or at night when the headlights of a just passed vehicle shine on the mirror 12. The layer 22 is preferably red but may be any other color which provides sufficient contrast to the image reflective surface 16.

The horizontal line 24 is normally located below the vertical mid-point of the mirror 12, preferably about ⅓ of the height of the mirror up from the bottom of the mirror. The line can me made in various widths, however a preferred width is in the approximate range of between 1/16" and 3/16" (0.159 cm and 0.476 cm)

The layer 22 forming the light reflective line 24 can be made of any suitable reflective material such as reflective granules 26 as shown in FIG. 4 which are adhesively attached to the back side of the mirror glass panel 14, or it can be in the form of a foil tape 28 shown in FIG. 5 attached to the back side of the image reflective layer 18 and in register with the gap 20 so that it is visible through the gap 20 from the front of the mirror.

The mirror 12 is retained in a contoured backplate 30 as shown in FIG. 2, by adhesive or other suitable fastening means. The backplate 30 has a centrally located opening 32 therein for receiving ball 34 on a threaded shank 36 which is adapted to screw into a threaded hole on a mirror outer housing (not shown) since such mirror mounting are conventional on automotive vehicles. A clamp ring 38 is pulled against the ball 34 by screws 40 to permit limited swiveling movement of the mirror device 10 for angular adjustment of the mirror 12 to the visibility needs of each driver of the vehicle. The mirror device 10 can be adjusted remotely from within the vehicle by any conventional electrical or mechanical means.

Referring back to FIG. 1, in operation of the invention, the mirror device 10 is adjusted to the proper angular orientation to suit the driver of the vehicle, then after the vehicle carrying the mirror device 10 passes another vehicle, when the vehicle appears in the mirror 12 as the large image 42 (shown in chain dotted lines) extending below the line 24 there is not a sufficient distance between the vehicles to safely pull into the lane in front of the passed vehicle. Once the image of the passed vehicle appears as the small image 42' (shown in solid lines) appearing entirely above the line 24, this indicates that the vehicles are at a safe distance apart from each other for pulling in front of the passed vehicle.

While the mirror device 10 can be installed as original equipment on vehicles, the mirror 12a can be retrofitted to an existing mirror 12b by use of contact adhesive patches 44 on the back of the mirror 12a. It should be understood that the mirror 12a contains reflective layers and a horizontal line similar to the mirror 12 however, these details have not been shown in FIG. 3 for the purpose of simplicity.

As a further decorative feature of the mirror 12, a company logo 46 such as shown in FIG. 1 may placed any suitable location on the mirror. The logo can be made in the same contrasting reflective material as the horizontal line 24 so that it is visible both day and night.

An additional indicia which may also be used on the mirror 12 is shown in FIG. 6 in which the indicia 48 is a warning sign comprising the word "NO" superimposed over a circle with a slash mark thereacross. This warns the driver that if the just passed vehicle shows below the horizontal line 24, there is not sufficient distance between the cars to pull into the lane in front of the just passed car. A safe distance is considered to be in the range of from 35 feet to 40 feet, (10.67 meters to 12.19 meters). The indicia 48 can also be made from the same reflective material as the lines 24.

Referring now to FIGS. 7 and 8, another embodiment of the invention is shown is which a mirror 12d having a glass panel 14d has an image reflective layer 18d adhered to the back side of the glass panel 14d. The layer 18d has a long horizontal gap 20d therein positioned similar to the gap 20 shown in FIGS. 1 and 2. Located within the gap 20d is a long strip or layer 24R of light reflective material and lying in edge to edge relationship with the strip 24R is a long black strip or layer 24B of non-reflective material. The black strip 24B appears as a horizontal line which contrasts to the image reflective layer 18d during daylight conditions. The light reflective strip 24R is red or other contrasting color and appears as a reflected horizontal line which contrasts to the image reflective layer 14d when vehicle headlights shine upon it at night. The black strip 24B may also be used alone or in combination with the light reflective strip 24R as shown in FIGS. 7 and 8.

FIG. 9 shows another variation of the invention in which a mirror 12c having a glass panel 14c has an image reflective layer 18c adhered to the front face of the glass panel 14c. The layer 18c has a long horizontal gap 20c therein which permits a light reflective layer 24c on the back side of the mirror 12c to show through the glass panel 14c and provide the image of a horizontal line of contrasting color to the image reflective layer 14c. This embodiment could also use the combination of a red reflective strip and a black non-reflective strip as described in FIGS. 7 and 8. In some embodiments of the invention it may be desirable to tint the glass panel with an amber color to reduce the glare of headlights of other vehicles shining on the mirror.

It should be recognized that although a horizontal line has been shown as a location of reference for determining a safe distance from another vehicle for changing lanes, other configurations or indicia may be used for this purpose. In some instances one or more vertical lines may be used as a distance indicator.

These and various other modifications may be made in the device shown and described herein without departing from the scope of the invention.

I claim:

1. A distance indicating mirror device for attachment to a vehicle to indicate a safe distance for a passing vehicle to pull into the lane of a just passed vehicle, the device comprising:

a convex mirror having a transparent panel member having a front side and a back side and an image reflecting layer in intimate face to face contact with one side of the transparent panel member for reflecting an image of a passed vehicle;

the image reflecting layer having at least one indicia shaped opening therethrough; and a reflective indicia layer of contrasting visibility to the image reflecting layer positioned on the transparent panel member of the mirror in registry with the indicia shaped opening so as to be visible, as indicia, therethrough;

said indicia being positioned in such a location that an image of a passed vehicle appears at a predetermined position on the mirror with respect to the indicia when the passing vehicle is at a safe distance for pulling into the lane of the passed vehicle;

said indicia being visible under both daylight conditions and reduced light conditions when exposed to the headlights of the just passed vehicle.

2. The device claimed in claim 1 wherein the indicia is a horizontal line located near the vertical midpoint of the mirror.

3. The device claimed in claim 2 wherein the passing vehicle is a safe distance ahead of the passed vehicle to pull into the lane of the passed vehicle when the passed vehicle appears above the horizontal line on the mirror.

4. The device claimed in claim 2 wherein the line is a short distance below the vertical midpoint of the mirror.

5. The device claimed in claim 2 wherein the horizontal line is in an approximate range of between 1/16" and 3/16" (0.159 cm and 0.476 cm) in width.

6. The device claimed in claim 2 including the word "NO" located below the horizontal line.

7. The device claimed in claim 6 wherein the word "No" is superimposed over a circle with a diagonal slash mark thereacross.

8. The device claimed in claim 1 wherein the indicia layer is a contrasting color to the image reflective layer of the mirror.

9. The device claimed in claim 1 wherein the indicia layer is comprised of granular reflective particles adhesively secured to the rear side of the mirror.

10. A distance indicating mirror device for attachment to a vehicle to indicate a safe distance for a passing vehicle to pull into the lane of a just passed vehicle, the device comprising:

a convex mirror having a transparent panel member having a front side and a back side and an image reflecting layer in intimate face to face contact with one side of the transparent panel member for reflecting an image of a passed vehicle;

the image reflecting layer having at least one horizontally extending indicia shaped opening therethrough; and a horizontally extending reflective indicia layer of contrasting visibility to the image reflecting layer positioned on the transparent panel member of the mirror at a location near the vertical midpoint thereof and in registry with the indicia shaped opening so as to be visible, as indicia, therethrough;

whereby when the image of a passed vehicle appears above the indicia, the passing vehicle is at a sufficiently safe distance ahead of the passed vehicle to pull into the lane of the passed vehicle;

said indicia being visible under both daylight conditions and reduced light conditions when exposed to the headlights of the just passed vehicle.

11. The device claimed in claim 10 wherein the indicia is a horizontal line located near the vertical midpoint of the mirror.

12. The device claimed in claim 11 wherein the passing vehicle is a safe distance ahead of the passed vehicle to pull into the lane of the passed vehicle when the passed vehicle appears above the horizontal line on the mirror.

13. The device claimed in claim 11 wherein the horizontal line is a short distance below the vertical midpoint of the mirror.

14. The device claimed in claim 11 wherein the horizontal line is in an approximate range of between 1/16" and 3/16" (0.159 cm and 0.476 cm) in width.

15. The device claimed in claim 11 including the word "NO" located below the horizontal line.

16. The device claimed in claim 15 wherein the word "No" is superimposed over a circle with a diagonal slash mark thereacross.

17. The device claimed in claim 10 wherein the indicia layer is a contrasting color to the image reflective layer of the mirror.

18. The device claimed in claim 10 wherein the indicia layer is comprised of granular reflective particles adhesively secured to the rear side of the mirror.

19. A distance indicating mirror device carried by a passing vehicle for indicating a safe passing distance between the passing vehicle and a passed vehicle comprising:

a convex mirror having a transparent panel member having a front side and a back side and an image reflecting layer in intimate face to face contact with one side of the transparent panel member for reflecting an image of a passed vehicle;

the image reflecting layer having at least one indicia shaped opening therethrough; and a reflective indicia layer of contrasting visibility to the image reflecting layer positioned on the transparent panel member of the mirror in registry with the indicia shaped opening, so as to be visible, as indicia, therethrough and positioned on the mirror for providing a location of reference on the mirror for judging the distance between the passing vehicle and the passed vehicle;

said indicia being visible under both daylight and nighttime conditions when exposed to the headlights of the just passed vehicle.

20. A distance indicating mirror device as claimed in claim 19 wherein the indicia layer is formed of a reflective material adhered to the rear side of the mirror in such a position as to show through the mirror in areas not covered by the image reflective layer of the mirror, said indicia being formed of material of a contrasting color to the image reflective layer of the mirror.

21. A distance indicating mirror device as claimed in claim 19 wherein at least part of the rear side of the mirror contains a layer of contact adhesive protected by a peel-off cover sheet for attaching the back of the mirror to a front face of an existing mirror mounted on a vehicle.

22. A distance indicating mirror device as claimed in claim 19 including on the reflective layer an indicia representing the logo of the vehicle manufacturer.

23. A distance indicating mirror device as claimed in claim 22 wherein the logo is formed from the same type of reflective material as the reflective indicia which provides the distance indicating reference location.

24. A distance indicating mirror device as claimed in claim 19 wherein at least part of the indicia layer providing a reference location on the mirror is formed of a black non-reflective material.

25. A distance indicating mirror device as claimed in claim 24 wherein the indicia layer is comprised of a first horizontal line of light reflective material of contrasting visibility to the image reflective layer of the mirror and a second horizontal line of black non-reflective material in edge to edge relationship with the first horizontal line.

26. A distance indicating mirror device as claimed in claim 19 wherein the image reflecting layer is adhered to the front side of the mirror and the reflective indicia is adhered to the back side of the mirror.

27. A distance indicating mirror device as claimed in claim 19 wherein the mirror is tinted an amber color to reduce glare from headlights of other vehicles.

* * * * *